INVENTOR.
ALEXANDER ROTH
BY L. S. Saulsbury
ATTORNEY.

Aug. 17, 1965 A. ROTH 3,201,797

STEREOSCOPIC CINEMA SYSTEM

Filed Oct. 25, 1962

5 Sheets-Sheet 2

INVENTOR.
ALEXANDER ROTH

BY L. S. Saulsbury

ATTORNEY.

INVENTOR.
ALEXANDER ROTH
BY
L. S. Saulsbury
ATTORNEY.

INVENTOR.
ALEXANDER ROTH
BY L. S. Saulsbury
ATTORNEY.

INVENTOR.
ALEXANDER ROTH
BY L. S. Saulsbury
ATTORNEY.

United States Patent Office 3,201,797
Patented Aug. 17, 1965

3,201,797
STEREOSCOPIC CINEMA SYSTEM

Alexander Roth, 166 S. 2nd Ave., Fort Walton Beach, Fla.

Filed Oct. 25, 1962, Ser. No. 233,078
5 Claims. (Cl. 352—86)

This invention relates to the production of projected images in stereoscopic relief, and this application is a continuation-in-part of my copending application Serial No. 709,070, now abandoned.

It is the principal object of the present invention to provide a projection system which will produce a full stereoscopic effect without the viewer needing glasses or visual aids to view the picture.

The principles of such stereoscopic presentation have been well established and have been dealt with in the patents to Ives, 1,883,291, Kanolt, 2,075,853, and Beard, 2,716,919. In carrying out these principles, a screen has been generally devised such that when the images are projected upon the screen, each element of the screen reflects light rays in certain controlled directions and different picture aspects are seen as the viewing eye roves about. In prior systems, this controlled scattering of the light rays has been produced by means of screens formed of plural reflecting elements that require that accurately registered panoramagrammic or similar images be placed thereon by one or by several projectors.

According to the present invention, only one projector is required and precise or accurate registration of an image against the screen is not a necessary criterion. The screen is made up of vertical reflecting sections which individually rotate or oscillate about their own vertical axes so that the direction of scattering in a horizontal plane becomes a function of time. Accordingly, there has been provided hereby a system wherein the required rays from the viewing screen will be produced simply by flashing the right picture at the viewing screen at the proper time in its rotation and the three dimensional effect will not have to rely upon a right eye or a left eye picture as with the prior systems. As a result there is no problem of distributing such images to the respective eyes of the viewers. There will be no blank areas in the viewing field, and the viewer cannot assume such a position where a right eye picture will enter the left eye or where a left eye picture will enter the right eye. Different pictures will be viewed, with never any repetition, as the viewer walks across one side of the viewing area to the other. Thus by the viewer merely changing his position in front of the screen different views of the images may be enjoyed from different angles.

Figure 1:
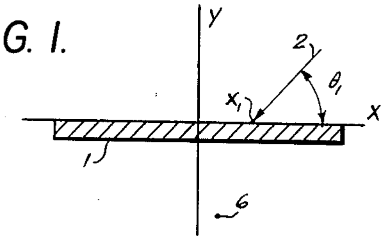
Figure 5:
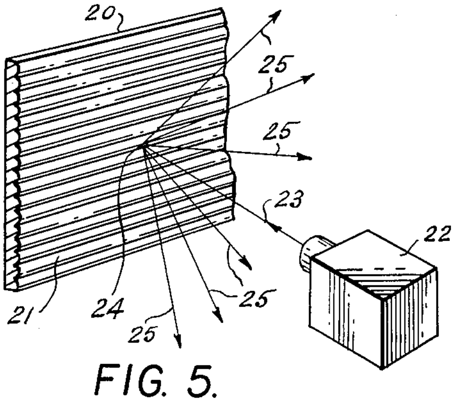
Figure 2:
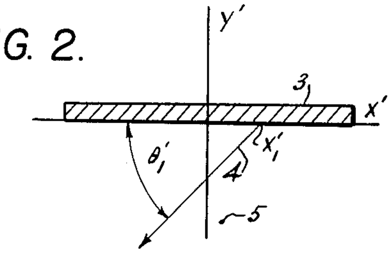
Figure 6:
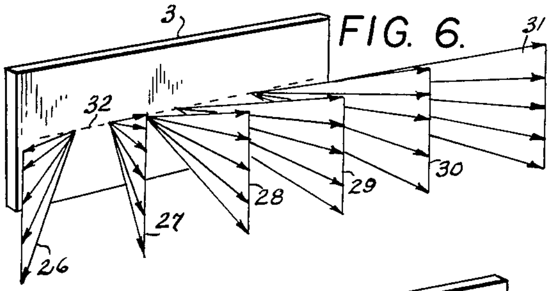
Figure 7:
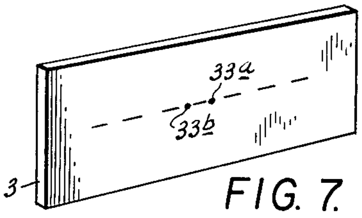
Figure 3:
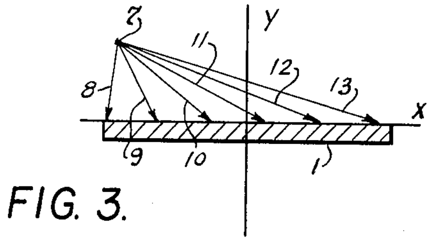
Figure 8:
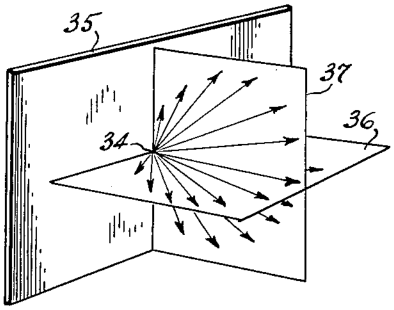
Figure 4:
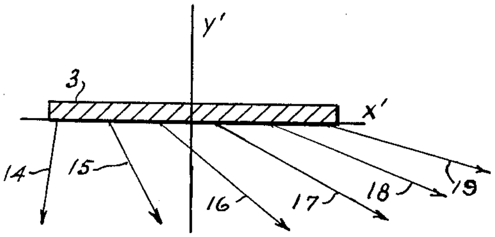
Figures 9, 11:
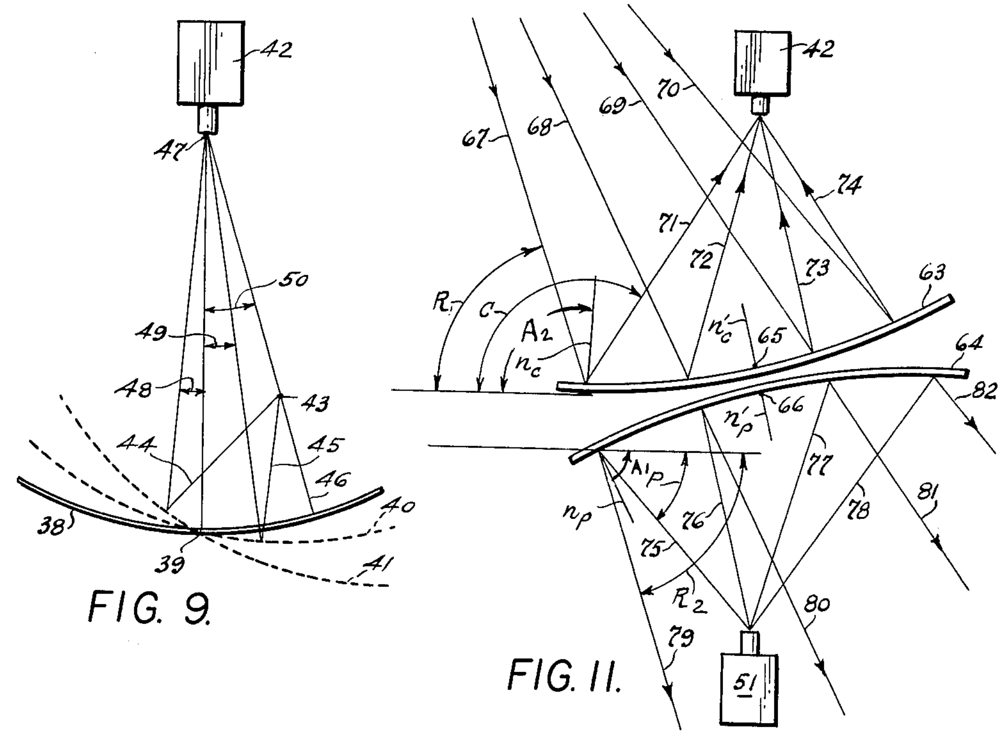
Figure 10:
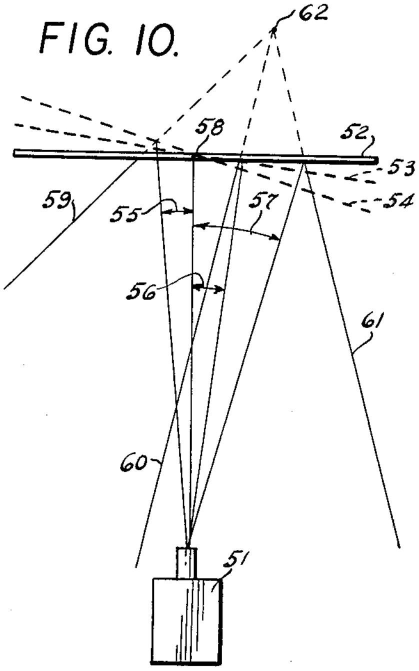
Figure 12:
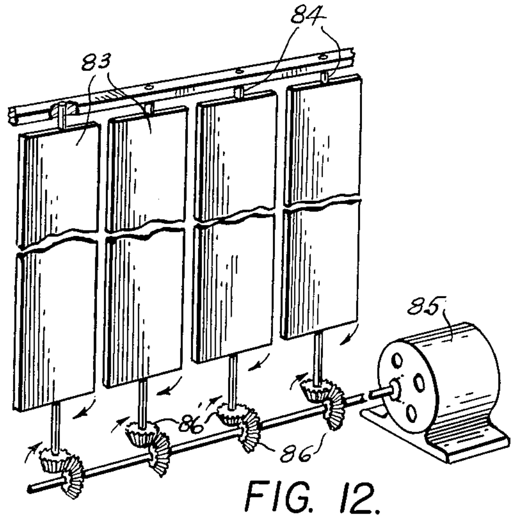
Figure 14A:
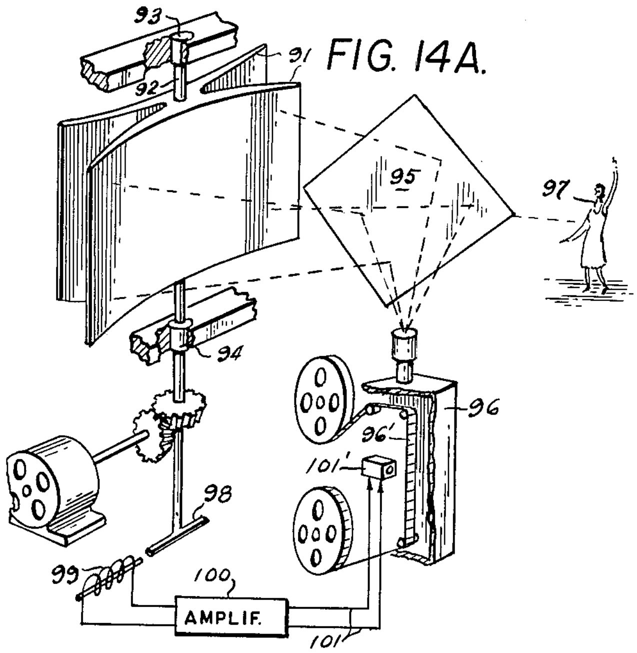
Figure 13A:
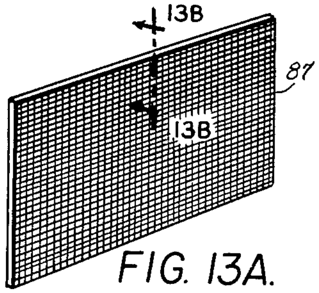
Figure 13B:
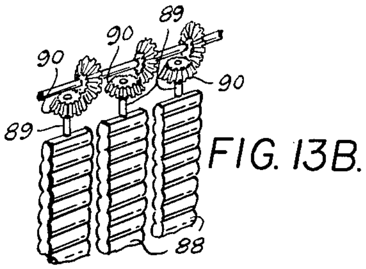
Figures 14B, 15, 16:
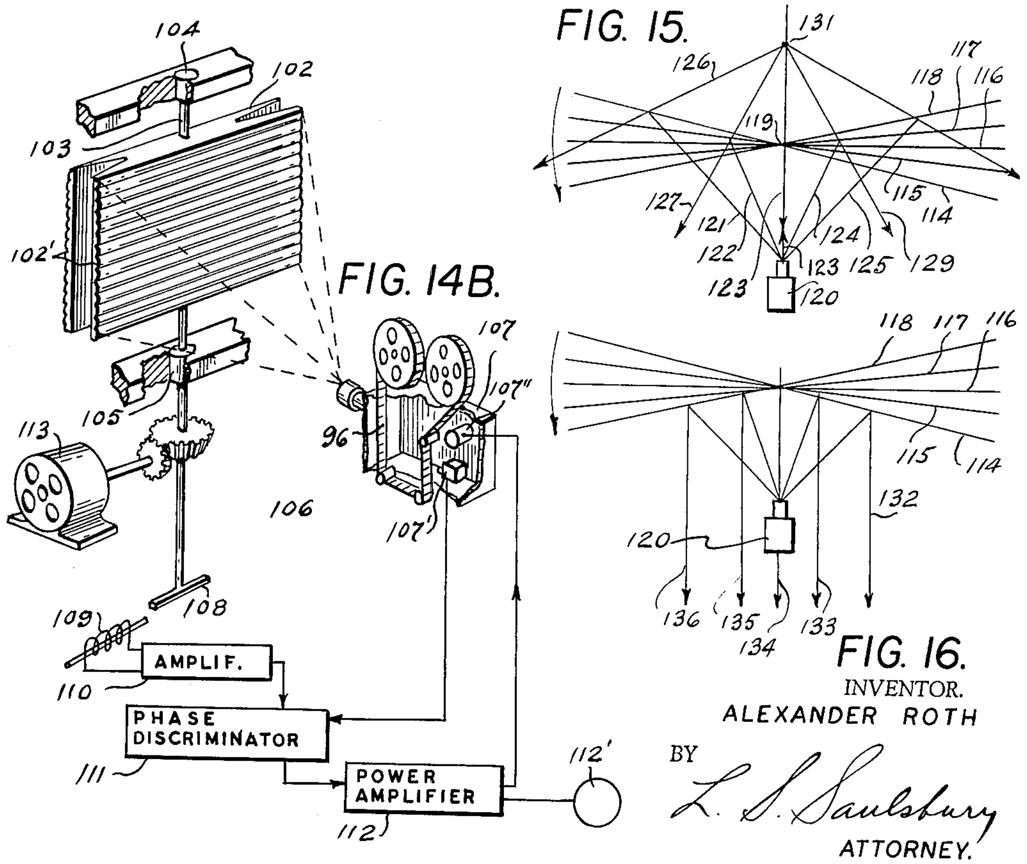
Figures 17, 18, 19, 20, 21, 22, 23, 24, 25, 26, 27:
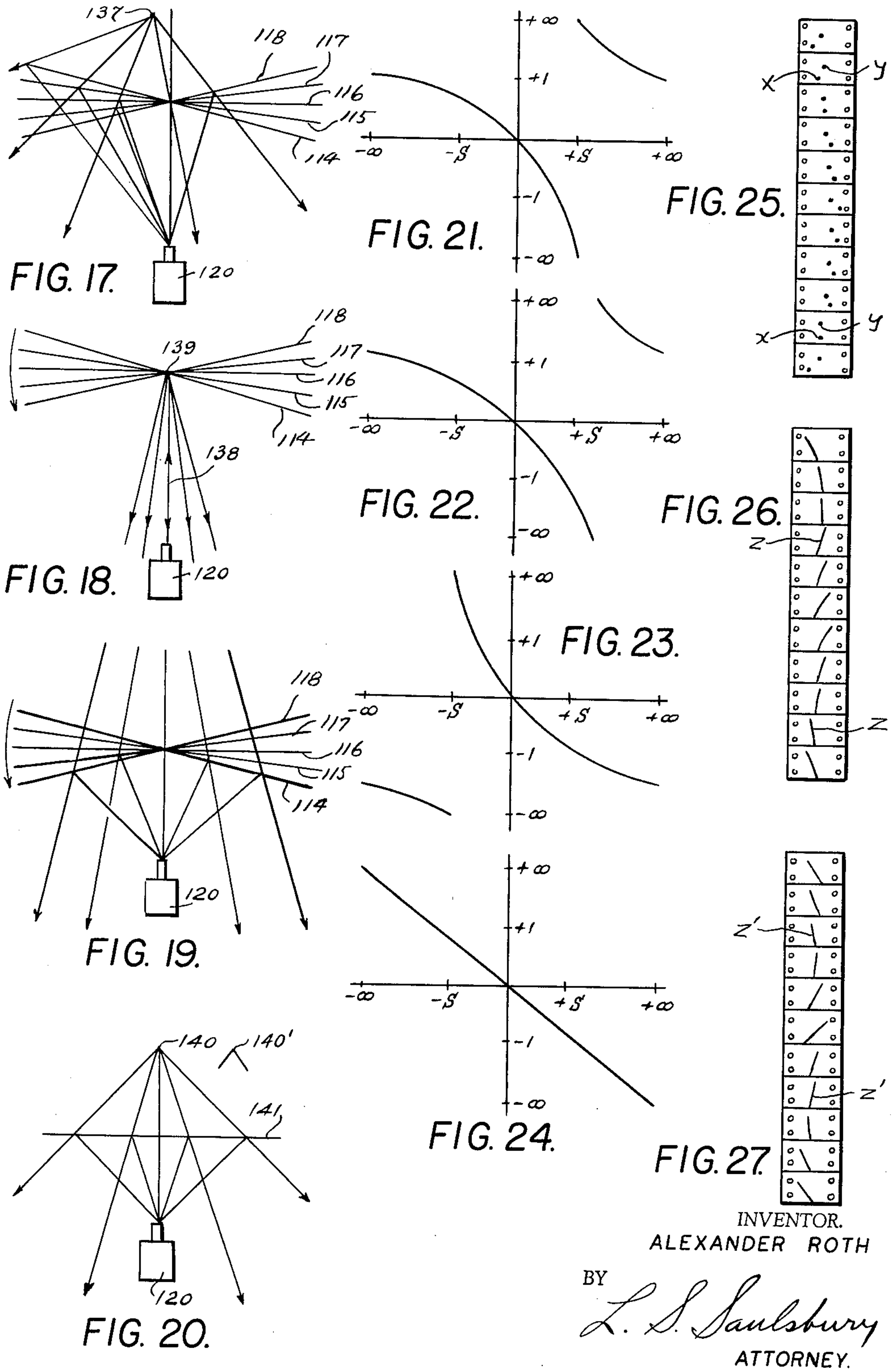
Figure 28A:
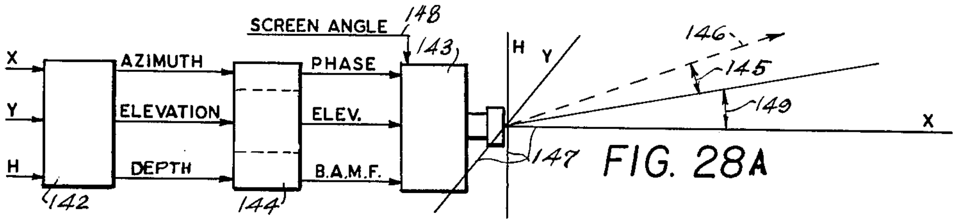
Figures 28B, 29, 30, 31, 32:
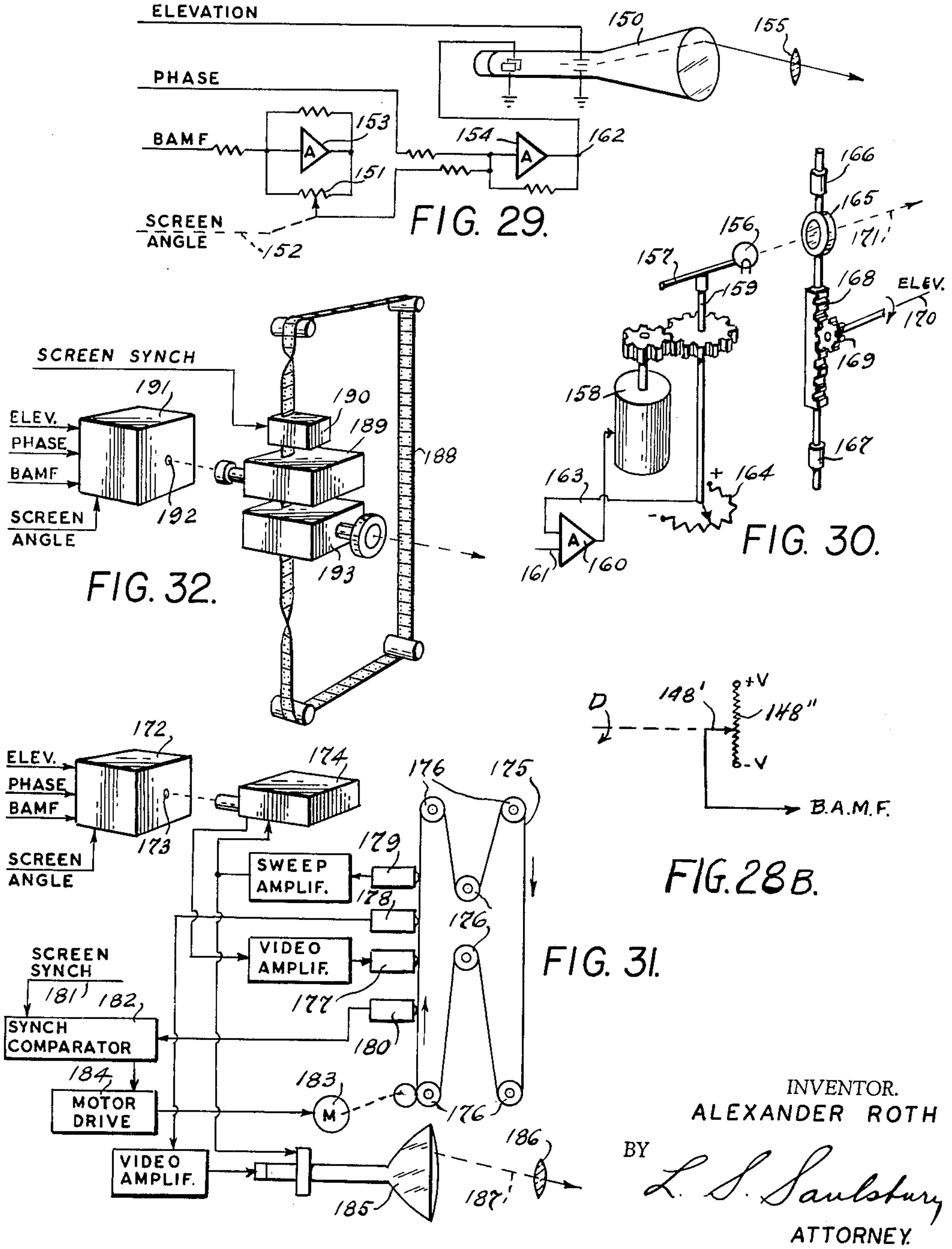

For a better understanding of the invention, reference may be had to the following detailed description taken in connection with the accompanying drawing, in which:

FIGURE 1 is a geometric view of a hypothetical scene recorder with but a single light ray being recorded, FIG. 2 is a geometric view of a hypothetical scene viewer with but a single light ray being projected, FIG. 3 is a geometric view of a hypothetical scene recorder with multiple light rays being recorded, FIG. 4 is a geometric view of a hypothetical scene viewer with multiple light rays being projected, FIG. 5 is a diagrammatic and perspective view of a fragment of a screen that would be used in viewing a single beam projected thereon, FIG. 6 is a diagrammatic and perspective of the viewing screen of FIG. 4 when a single point is projected thereon, FIG. 7 is a diagrammatic and perspective view of the viewing screen when the point is projected and illustrating different picture to each eye of the viewer. Since the eyes how the point is viewed by the respective right and left eyes, FIG. 8 is a diagrammatic view illustrating how the light rays from a conventional viewing screen are reflected when a point is projected thereupon, FIG. 9 is a diagrammatic view of the camera and curved taking screen for making the stereoscopic pictures of a single point, FIG. 10 is a diagrammatic view of the projector and viewing screen for projecting a stereoscopic picture of the single point, FIG. 11 is a composite ray diagram for both the making and the projecting of stereoscopic pictures, FIG. 12 is a fragmentary perspective view of a sectionalized mirror of the stereoscopic screen that can be used for both the taking and the projecting of the pictures, FIG. 13A is a perspective view of a section of a viewing screen with many elements, FIG. 13B is a fragmentary perspective view of this sectionalized viewing screen, FIG. 14A is a perspective and diagrammatic view of the apparatus for making the stereoscopic films, FIG. 14B is a perspective and diagrammatic view of the apparatus for projection of the images of the stereoscopic film upon the viewing screen, FIG. 15 is a ray diagram illustrating the projecting of a point to appear at a distance, FIG. 16 is a ray diagram illustrating the projecting of a point to appear at infinity, FIG. 17 is a ray diagram illustrating the projecting of a point to appear offset, FIG. 18 is a ray diagram illustrating the projecting of a point to appear on the viewing screen, FIG. 19 is a ray diagram illustrating the projecting of a point to appear at a great distance, FIG. 20 is a ray diagram illustrating projecting of a point to appear beyond the viewing screen a distance equal to the distance the projector is in front of the screen, FIGS. 21 to 24, are charts of the beam angle multiplication factor plotted against the distance of the image from the screen for the different screen parameters, FIG. 25 illustrates a film sequence for the projection of two points, FIG. 26 illustrates a film sequence for the projection of a line, FIG. 27 illustrates a film sequence for the projection of a line upon a screen of a different type than the screen used in producing the film sequence of FIG. 26, FIG. 28A is a diagrammatic view of the projecting apparatus for converting azimuth to phase, proportioning elevation and depth to the beam angle multiplication factor, FIG. 28B is a diagrammatic view of the potentiometer circuit used in the apparatus of FIG. 28A for converting the depth to the beam angle multiplication factor, FIG. 29 is a diagrammatic view of a cathode ray tube apparatus for projecting these time varying points, FIG. 30 is a diagrammatic view of another apparatus for projecting time varying points, FIG. 31 is a perspective view of the apparatus for projecting time varying points and their past history, and FIG. 32 is a diagrammatic view of still another apparatus for projecting points and their past history.

The present stereoscopic projection system has application to a cinema type system whereby motion pictures can be projected with stereoscopic effect and to the projection of artificial data, as for example, a set of three dimensional coordinates, gridwork, and various loci integrated into the space of the presentation in viewing screen.

In order to generate a stereoscopic scene which may be viewed with the unaided eye, it is necessary to present a of an individual are normally horizontally related to each other, the viewed scene of the stereoscopic display system should change as the viewer moves horizontally. It is unnecessary for the scene to change when the eye is moved vertically and the present stereoscopic system in this respect may be said to be similar to some prior stereoscopic systems. In other words, if the height of the viewing eye is varied, the scene remains primarily unchanged except for foreshortening or appearing smaller due to the change in the viewing aspect of the screen. However, the scene as viewed from different horizontal positions, changes in such a way as to generate the desired stereoscopic effect. The type of stereoscopic scene proposed by the present invention, however, differs from prior inventions in that the scene changes as the eye is moved horizontally in front of the viewing screen and never repeats a previous pattern. Thus, every scene as viewed from one point in the viewing area is different from any other scene at any other point horizontally displaced therefrom. A stereoscopic presentation generated in this manner provides added realism in that the viewer can change the perspective of the scene by merely changing his position before the screen and thus obtain rotated views of the screen. And further, there will never be any stereoscopic reversal or blank space in the general viewing area.

The general principles involved will be explained as follows. In FIGURE 1, 1 represents a horizontal cross-section of a device which for the time being may be considered a scene-recorder with a ray 2 entering the scene-recorder at the point $x_1$ of the coordinates $x$, $y$. This ray 2, which is a completely arbitrary ray coming from somewhere in the scene, has an inclination of $\theta_1$ with respect to the $x$ axis. The ray while abitrary is but one of an infinite spectrum of rays entering the scene recorder 1, at all angles, and all locations $x$, with any intensity and color.

In FIG. 2, there is shown a horizontal cross-section of what for the time being, may be considered a scene viewer 3. The ray 4 is shown emerging from the scene viewer with the angle $\theta_1'$ at the point $x_1'$ with respect to the coordinate system $x'$ and $y'$. The scene viewer synthesizes and projects each and every ray of the infinite number, of which ray 4 is but one of the set, so that $\theta_1'$ equals $\theta_1$, and $x_1'$ equals $x_1$. When the above conditions are fully met, an observer standing at 5 in FIG. 2, and looking into the scene viewer 3 will see the stereoscopic representation of the scene he would have seen, if he had been located at point 6 in FIG. 1, if the scene recorder 1, had not been there. Since FIGS. 1 and 2 are horizontal cross-sectional views only horizontal projections of the various rays have been shown. However, the incoming ray 2 does not have to be in the plane of the cross-section. This ray 2 could be any ray, at any inclination to the screen, terminating however, for convenience in the plane of the cross-section at $x_1$. The emerging ray 4, FIG. 2, however, originates at $x_1'$, in the plane of the cross-section where the cross-section of FIG. 2 is taken at the same height of the screen of FIG. 2 as the cross-section of FIG. 1 is with respect to the screen of FIG. 1. Ray 4 may actually consist of a "fan" of rays originating from $x_1'$ all elements of which are in the same vertical plane and have line 4 as their horizontal projection.

In FIG. 3 a point source of light 7 is being projected upon the scene recorder 1. Rays 8, 9, 10, 11, 12 and 13 will emanate from the point source 7 and enter the scene recorder 1. These latter rays are shown as horizontal projections, and represent an infinite number of such rays which enter the scene recorder 1 at every point of its front surface lying between rays 8 and 13. In FIG. 4 the scene viewer emanates rays 14 to 19 corresponding respectively to the respective rays 8 to 13. The rays 14 to 19 are thus the "fans" such as described above in connection with FIG. 2. An observer viewing the scene viewer 3 of FIG. 4, will accordingly appear to see the light source 7 of FIG. 3 at a distance behind the scene viewer 3 equal to its true distance. Thus, the rays 14 to 19 of FIG. 4 have a virtual source appearing to the viewer in proper depth.

In FIG. 5, 20 represents a fragment of a viewing screen of a type that is required to carry out the present invention and on which there is provided a horizontally corrugated or ribbed surface 21 and which is a specular reflector. If a projector 22 projects a single beam 23 at this viewing screen 20, the beam will intersect the screen 20 at 24 and form a reflected "fan" of rays 25. If the screen 20 is vertical with the corrugations 21 running horizontal then all of the rays 25 will lie exactly in the same vertical plane. If the rays 25 were observed along a horizontal plane the laws of reflection will be obeyed in every ray. Thus, there has been illustrated in FIG. 5 a technique for the generation of the type of rays emanating from the viewing screen 3 of FIG. 4 put into vertical planes.

In FIG. 6, a perspective view of the viewing screen 3 of FIG. 4 is shown with sets of fans of rays 26 to 31 corresponding respectively to the sets of rays 14 to 19 of FIG. 4. In addition, some of the rays corresponding to the set of vertical rays 25 of FIG. 5 are shown in each of the fans 26 to 31 of FIG. 6. It is understood that in reality there are an infinite number of fans and an infinite number of rays in each fan, these rays being thus merely taken for illustration. A horizontal line 32 represents the locus of points from which each set of the fans 26 to 31 emanate. An observer viewing the screen with one eye would naturally only see those rays of light which enter his pupil from but one single point source somewhere on the horizontal line 32. If the observer opens the other eye and closes the first eye he will see a different set of rays emanating from a different point source horizontally displaced from the first point, however, still on the horizontal line 32. Thus, the basic requirements for stereoscopic representation of a point source of light have been provided. Each eye sees a different point and the divergence of the rays entering the eyes will produce depth in the vision of the viewer. If the eyes are displaced vertically, the scene remains exactly the same except for a slight foreshortening.

In FIG. 7, points 33*a* and 33*b* are what will be seen by the viewer. The right eye sees the point 33*a* and the left eye sees the point 33*b*. If the original point 7 projected upon the scene recorder 1 of FIG. 3 were infinitely far away, all of the fan sets 26 to 31 of FIG. 6 would then become parallel and the two viewed points 33*a* and 33*b* would bear exactly the same separation from each other as to the separation of the pupils of the viewer's eyes thereby merging the light spots into a single spot of light infinitely far away. At all finite or nearer distances the separation between the points 33*a* and 33*b* will be less than the interpupillary distance.

In FIG. 8, there is shown a representation of the rays emanating from an elemental point in a conventional two-dimensional picture screen 35. A single point in the scene is located at 34 in the image screen plane. Planes 36 and 37 respectively show the projection of the distribution of the rays projected horizontally and vertically from the point 34. Every ray emanates from this point 34, and all rays are related to each other through some law of reflection, approximating Lamberts law, if the screen is a pure scatterer or diffuser of light.

In comparing FIG. 8 with FIG. 6 a good estimate of a difference in the representation of a single point can be had as between a conventional two dimensional type of viewing screen and a stereoscopic three-dimensional viewing screen such as utilized in carrying out this invention. Although it might appear that light is less efficiently utilized in the screen of FIG. 6 than in the screen of FIG. 8, this is not so. The light flux at the screen of FIG. 6 is much weaker than the light flux at the screen of FIG. 8 because it comes from an extended line source 32 since at any given viewing distance of the viewer the light flux at the viewing distance is the same for both screens, neither screen would waste much more light than the other.

A viewer walking from one side to the other of the screen 3 of FIG. 6 will see the points representing the source of the fan of rays move across the screen 3 until it reaches the end of the screen. This is as it should be for proper stereoscopic presentation. However, as the observer moves up and down he does not observe the same effect in elevation, the point always seems to emanate from the line 32 and has not vertical motion at all. If the viewer tilts his head so that his eyes are no longer horizontal with respect to each other he will lose the stereoscopic effect of the presentation and will see two-dimensional picture.

Generally the apparatus for carrying out my invention comprises a motion picture camera, a rotating mirror toward which the movie camera is directed to take the picture, the picture film taken by the camera, a motion picture projector and a rotating mirror viewing screen upon which the picture is projected for the viewers to view the scene.

In FIGS. 9 and 10, there is shown one possible arrangement of the above mentioned parts to carry out the stereoscopic camera and projection system of this invention. FIG. 9 shows a horizontal cross section of a specular reflector 38 of arcuate shape. This reflector is rotatable about axis 39 as illustrated by two other positions 40 and 41. A motion picture camera is depicted at 42. A point source of light 43 is shown emitting three rays of light 44, 45 and 46, each of these three rays are unique in that they represent the only ones which can leave the source and undergo a reflection by the mirror screen shown at the three positions 38, 40 and 41 and enter lens 47 of the camera 42. Since the reflector 38 rotates continuously about its axis 39 and in sequence occupies an infinity of intermediate positions not shown in the diagram, thus there are an infinity of rays emerging from the point source 43 and entering the camera similar to the ones 44, 45 and 46. However, for purposes of clarity only the three positions 38, 40 and 41 of the reflector are shown and only three rays respectively enter the camera at the respective three angles shown at 48, 49 and 50, and three pictures are produced by three images of incoming light rays at angles 48, 49 and 50 upon the camera film. The camera records many frames of film for each rotation of the screen, or at least one frame for each increment of screen rotation, where an increment is some arbitrarily small angle.

In FIG. 10, there is shown a plan view of the viewing system of a motion picture projector 51, a rotating viewing screen 52 in its position normal to the axis of the projector with two other positions 53 and 54 shown in phantom. If the film sequence exposed to the camera 42 is projected through projector 51 the output from projector 51 will appear to be a sweeping pencil of light. Three successive positions of the pencil are shown in FIG. 10 at 55, 56 and 57 that respectively correspond to the three beam angles 48, 49 and 50 of FIG. 9. In addition, the geometry and the synchronization has been such that at the instant that the ray angle from projector 51 is shown at 55 the screen at 54 has an angle of rotation about its axis 58 exactly equal to the angle of reflector 41 about axis 39 at the moment that ray 44 was being recorded upon the film when in the camera 42. The same coincidence applies to ray 45, mirror position 40, the ray with angle 56 and screen 53. Upon completing the ray diagram of FIG. 10 by showing the rays reflected from the screen positions 52, 53 and 54, rays 59, 60 and 61 are obtained which are seen to correspond exactly to rays 44, 45 and 46, from the light point source 43 of FIG. 9. Although only three rays are shown in FIG. 10 there is actually a closely spaced spectrum of rays all of which have a virtual point 62. The virtual point 62 has a virtual distance behind the screen 52 which is exactly the same distance as the actual distance of light source point 43 in front of the mirror reflector 38 of FIG. 9. In addition, the distance of point 62 to the right of the projector axes is similarly the same as the lateral distance of points 43 from the camera. It should be specified that the viewing screen 52 must contain the corrugations extending horizontally as described above in connection with the illustration of FIG. 5 to generate vertical fan beams. In the case just shown reflector 38 of FIG. 9 has a horizontally-extending inner reflective surface which has a radius of curvature exactly equal to the distance from the reflector to the camera 42. Since the arcuate reflector is used for taking the picture, a rotating viewing screen as in FIG. 10 having a straight line horizontal section will be used for projecting the picture. It is imperative however that the rotation of the reflector and screen be synchronized with the film so that the particular frame of the film which was exposed the instant of taking the picture, in FIG. 9, be timed so that this frame of the developed film gets projected the instant the viewing screen goes through the same corresponding position of rotation. The reflector and screen may, however, actually rotate through angles in proportion to one another rather than identical angles, and the projector 51 may project angles which are proportionally greater or smaller magnification or attenuation than those angles of the reflector image which were picked up by the camera 42. The use of different contours will be discussed.

In summary, the motion picture camera 42 takes pictures of a scene, by photographing a film sequence from a mirror or reflector with a curved surface rotating about a vertical axis. The scene being photographed is always in front of the mirror, but can be either in front or behind the camera. A multiple of motion picture frames are taken for each rotation of the reflector 38. The developed film is then projected upon the rotating flat mirror screen 52 into which the viewer looks. Synchronization is maintained between the reflector and the screen positions with respect to corresponding frames of film when in the camera and when in the projector. The viewing screen and the taking reflector are in general similar to each other except for one fundamental difference, the viewing screen 52 has a horizontally corrugated reflecting or mirror surface to provide vertical diffusion, while the taking screen is not corrugated. In other words, a vertical section of the viewing screen 52 will reveal corrugations, while a vertical section of the taking screen 38 has straight lines.

As shown in FIG. 11, a curved rotating mirror or reflector 63 is used with the camera 42 for the taking of the picture upon the film. A curved rotating mirror viewing screen 64 is used with projector 51, each of which rotates about its axis 65 and 66. The reflector 63 and 64 are not actually used in relation to each other as shown in FIG. 11. Camera 42 and the reflector 63 would normally be located remotely from the viewing screen 64 and projector 51. The reflector and screen are shown as they are in FIG. 11 merely for simplifying the explanation of the recording and reconstructing the light rays in effect upon the screen. It should be understood that the reflector and screen could not be actually physically located as they are shown in FIG. 11, nor is it possible to project a picture at the same instant it is being taken.

A line $n_c'$ in FIG. 11 extends normal to the curved surface of the reflector 63 from a point 65 and a line $n_p'$ extends normal to the curved surface of the screen 64 from a point 66. Incoming rays 67, 68, 69 and 70 represent some of an infinite group of rays coming from a scene source not shown in the figure. The four reflected rays 71, 72, 73 and 74 corresponding to the respective rays 67, 68, 69 and 70 enter the lens of the camera 42. Rays 75, 76, 77 and 78 correspond to the respective rays 71, 72, 73 and 74 that were recorded on the film and projected by projector 51, having been placed in the projector with the film turned about so that the right and left sides are interchanged from the way the film is usually used in the conventional projector. For the showing of FIG. 11, it may be assumed that the angles of each of the rays 75 to 78 emanating from projector 51 are identical to the angles of the rays 71 to 74 which entered camera 42 to form the original picture. The rays 75 to 78 upon reflection from the screen 64 produce the rays 79, 80, 81 and 82. If the contour of the viewing screen 64 has been chosen properly relative to the contour of reflector 63, the viewing rays 79 to 82 will have exactly the same divergence as the rays 67 to 70 to which they correspond. Thus, a viewer standing before the viewing screen 64 and observing the rays 79 to 82 will observe an apparent point source for the rays which exactly correspond to the point source which produced ray bundle 67 to 70. It should be understood that the viewing screen 64 has horizontal corrugations for the vertical dispersion of the light rays, while the camera taking reflector 63 has no corrugations and that the rays shown in FIG. 11 are but the horizontal projections of the actual rays.

In FIG. 11, $n_c$ represents a normal of the mirror reflector 63, at any arbitrary point such as the point where ray 67 meets reflector 63. Similarly, $n_p$ represents a normal of surface 64 where ray 75 intersects the screen 64. Angle $R_1$ represents the angle of the incoming ray 67 and an identical angle $R_2$ is the angle of the viewing ray 79. Angle C represents the angle of the taking ray 71 which enters the camera 42, and angle P represents the angle of projected ray 75 leading projector 51. It is seen that the angle of $n_pA_1$ equals $R_2+\frac{1}{2}(P-R)$ and the angle of $n_cA_2$ equals $R_1+\frac{1}{2}(C-R_1)$. Therefore, angle $A_2$ minus angle $A_1$ equals $\frac{1}{2}(C-P)$. Thus, if a surface with particular contour is selected for the reflector or the screen and its normals are defined, then the normals of the other surface are fixed point by point by the above equation. In other words, knowing the angle of the one normal of one of the surfaces, the angle of the normal of the other surface can be computed. Also, the difference between the normals is a quantity which remains unchanged if the screens are oscillated or rotated such that normals $n_c'$ and $n_p'$ undergo a rotation by exactly the same angular amount. There are an infinite number of contour pairs which can be defined for the reflector 63 and screen 64 according to the above equation. For example, a right circular cylindrical surface and a flat surface are one pair, and two parabolic surfaces are another pair that can be used.

For very large mirror screens, the construction arrangement shown in FIG. 12 is suitable. The screen, instead of being a single rotating one is made up of several revolvable vertical mirror sections 83. Each of these sections 83 rotates with vertical shafts 84 that are driven by electric motor 85 through gears 86, and 86'. The contours of each of these screens are worked out by the same formulas as for the larger surfaces as given above. This sectionalized screen of FIG. 12 can be used for the taking of the picture and also for the viewing of the picture provided that the contours are geometrically correct and that horizontal corrugations are provided upon the viewing screen surface. The tolerance of the vertical edges of the various vertical sections must be held very closely so that the cylinders of rotation of the various sections are very nearly tangent to each other and there is no gap in the scene as viewed. In FIG. 12, four rotatable vertical sections of screen are shown, however, any number of sections may be used depending upon the size of the screen to be made. There may be as many as five hundred or one thousand such sections extended horizontally. Such a screen 87 formed of a large number of sections is illustrated in FIG. 13A.

In FIG. 13B taken from the area of 13B—13B of FIG. 13A, the fragments of three elements 88 of the sectionalized screen 87 are shown. The entire screen can be regarded as one large mirror of such curvature as determined by the distribution of the phase angles of the individual vertical sections. The reflection from such a screen is similar to the action of a fresnel lens or a zoned lens. With the screen 87 being regarded as a single large surface, the discussion in connection with FIGS. 9 and 10 still applies. If the screen is arranged so that the normals are parallel, the screen will be equivalent to a plane mirror. By changing the relative angle of the normals from section to section, a cylindrical, parabolic, or any contour surface may be simulated. As the normals all rotate, at a constant angular speed, the rotating equivalent of the planar, cylindrical, parabolic, etc., surface may be produced.

As seen in FIG. 13B the vertical sections 88 are rotatable with shafts 89 driven through gear sets 90. The vertical sections 88, if examined in horizontal cross section, would be found to have straight edges. This cross section could however be rectangular, triangular, square, circular, or any other shape. For example, a triangular section would present three reflecting surfaces for each rotation, whereas, the rectangular element of the small thickness as shown presents only two reflecting surfaces. These vertical sections 88 have horizontal corrugations which are necessary for the viewing screen. The height of each corrugation may be approximately equal to the thickness of each section because in the sectional screen the width of each section is roughly equal to a horizontal picture resolution, and the vertical picture resolution is generally the same as the horizontal picture resolution. The picture taking screen would not have corrugations and each of its vertical sections would have a plain, flat mirror surface.

It should be understood that the screen used for the taking of the picture with the camera and the screen used for the viewing of the picture with the projector are similar in most respects except that (1) the contour of the screens are different when examined in horizontal cross-section and that they are derived from the equations concerning the normals to the surface at any point as above discussed, (2) the screen used for the taking of the picture when examined in a vertical cross-section shows straight lines for its reflecting surface, whereas the screen used for the viewing of the picture reveals corrugations. These corrugations or rib-like formations run horizontally so that an impinging light ray will scatter in the vertical plane only and normal specular reflection in the horizontal direction will be unaffected.

For sectionalized screens, the curvature is not a factor in the assembly of a screen since the individual sections lack a horizontal curvature. Instead, the variation of the angles of the normals to each of the sections, going from section to section horizontally along the screen provides in effect a screen equivalent to a curvature in one large single piece reflector. The previously derived equation for the normals to the single large reflector serves as well for the normals of the vertical sections of the screen. As the individual section and their normals rotate the overall effect is the same as for the rotation of a single large reflector.

It should be understood that the invention is not to be limited to the types of reflective surfaces that have been described. Any type of reflective surface which focuses the rays of light as previously described may be used to generate a stereoscopic presentation according to the principles of the present invention. Such surfaces include, but are not limited by, for example, rotating fresnel mirrors, or corrugated fresnel lenses interspersed between a screen and the viewer to provide the optical equivalent of a contoured mirror. These surfaces without the corrugations could be used for the taking of the picture.

Whenever rotation is discussed herein, it is intended to mean rotation or oscillation of the reflecting surface in the general sense and not necessarily at constant angular speed. It may in addition to constant angular rotation consist of small angular rotation about a mean value commonly called a scan, or a rotation such that the angle of rotation may be any function of time provided only that there is a predetermined relationship between the rotation of the screen used for the making of the picture and the rotation of the screen used for the viewing of the picture.

Several complete projection systems will now be described. In FIG. 14A a rotating reflector 91 has right circular cylindrical surfaces arranged back to back and rotating with a vertical shaft 92 journalled in vertically-spaced bushings 93 and 94. This back to back arrangement permits angular rotation at one-half the angular speed of a single reflector surface. An angled half-silvered mirror 95 into which motion picture camera 96 is aimed to get a full view of a surface of the double reflector 91. The scene of interest and the performer 97 are in front of the reflector screen 91. Rays of light pass from performer 97 and the scene 97 through the half-silvered mirror 95 into reflector 91 and reflect back into an offset motion picture camera 96. The half-silvered mirror 95 is used only to allow the camera to be located out of the way of its own field of view and yet in a position to take the best picture. However, half-silvered mirror 95 could be dispened with and camera 96 at some other offset position.

In carrying out this invention, it is necessary to provide synchronization between the film in camera 96 and the instantaneous angular position of the rotating reflector 91. Thus a pickup device is employed to record a reference angle of the shaft 92 upon the camera film. Such a pick up device may include a rotating magnetic element 98 fixed to the lower end of the rotating shaft 92, FIG. 14A, which passes close to a pick up coil 99 to produce a voltage that will be amplified by amplifier 100. The amplified current is sent through wires 101 to a timing lamp 101′ located in movie camera 96 and when the timing lamp flashes it places a mark on an unused channel of the film 96′. In FIG. 14B 102 represents a viewing screen having flat screen surfaces arranged back to back but with ribs 102′ similar to ribs 21 shown in FIG. 5 being provided thereon. The viewing screen 102 is rotated by a shaft 103 journalled in bushings 104 and 105. Curved lines 106 represent the general viewing area of an audience and a projector 107 is located in front of the screen.

Assume the picture taking screens 91 are held stationary, for a moment, producing just a single picture on the film in camera 96 and this single picture is projected by the projector 107 to the ribbed viewing screen 102 which is similarly held stationary for a moment, an observer in the viewing area 106 will see, in each of his eyes, but a single vertical strip of light emanating from the viewing screen 102. All of the elements of a picture required by the observer to make sense as a complete picture are obtained only when the screen is rotated sufficiently so that the vertical strip of illumination moves laterally across the screen from one end to the other. At any one instant each eye will of course see a different vertical strip, one strip laterally spaced from the other, and when these vertical strips are integrated together at the end of a complete rotation, it is this difference that causes one to see a stereoscopic image. If the film in the projector remained still at a single frame and did not advance while the screen rotated, the integration of all of the vertical strips would result in a representation of a flat picture equivalent to the scene being projected. In addition, both eyes would see exactly the same picture. This picture will have the characteristics that it does not foreshorten to observers at the sides of the screen. This principle is described for the projection of conventional two dimensional pictures in British Patent 750,911 by Dennis Gabor, wherein there is but one picture projected for each complete rotation of the screen. In the present invention many specially prepared pictures are projected, for each rotation of the screen, in rapid succession so that each eye sees a vertical strip due to different pictures thereby producing stereovision. In order that both eyes of the viewer be presented a different picture to produce the stereoscopic effect, the picture in the projector must change one or more times as the illuminated vertical strip moves along the screen due to rotation thereof, the distance of travel before change of the picture being no more than the interpupiliary distance of the average viewer. The picture will then be changing often enough that each eye sees essentially a different image at any one portion of the screen, satisfying the requirement for the stereovision. Thus, for a screen twenty feet wide where the viewing audience may be seated at random anywhere in front of the screen (not to the sides) approximately ninety different pictures would have been taken by the camera 96 for projection by the projector 107 for each scan or rotation of one of the reflecting sides of screens 91 and/or 102. These ninety pictures will have produced but a single scene for viewing and to meet the requirements of cinematography this single scene must be repeated several times per second at a rate determined by the retentivity of vision. If twenty scenes per second is used the screens will be rotated or oscillated twenty screen frontals per second, then the particular system described for the picture making apparatus of FIG. 14A requires eighteen hundred pictures to be taken per second and this same number of pictures must be projected per second by the projecting apparatus of FIG. 14B. This, of course does not count those pictures wasted when the screens are at such an angle that the light rays are not reflected to the audience in the viewing area 106.

It should be apparent that both screens do not actually have to rotate through complete revolution but may instead be oscillated about their axes. If they are to be oscillated the back to back type of screens would not be used. The end results, however, would be exactly the same. Whether rotation or oscillation is used the exact angular position of the viewing screen for any given instant must be related to and synchronized with the particular picture (in this case one of ninety) which existed at the time the picture was made. As set forth, reference marks to be used for such synchronization are placed directly on the film as the film is made. In a similar fashion, a magnetic device 108 on shaft 103 that supports the viewing screen produces a reference pulse of voltage in a pick up coil 109 amplified by amplifier 110 when the shaft 103 is in its reference position. With the reference positions of the shafts 92 and 103 being at the same angle then the reference pulse as stored on the film 96 that is being run through projector 107 and picked up by a photoelectric pick up 107′ should occur at exactly the same instant as the reference pulse picked up by pick up coil 109 from the magnetic device 108 on the viewing screen shaft 103. The time difference between the two sets of reference pulses is examined by a phase discriminator 111 which varies, in power amplifier 112 having a power source 112′, the power which runs the motor 107″ in the projector thus closing the control loop. Thus using techniques well known in the art of servo-mechanisms, the projector motor 107″ can be closely controlled to provide exact synchronism of the viewing screen 102 with respect to the timing marks of the film 96 in the projector 107 identical to the synchronism originally present between the screens 91 and the same film having been used to make the picture with the camera 96. A free running motor 113 runs the viewing screen 102 at a fairly constant rate.

It has been pointed out that the sectionalized screen might be used as the reflector for the camera if sections are angularly phased to form the zones of a cylindrical reflector and then a flat rotating viewing screen may be used to properly display the projected picture made in this way and that a rotating flat screen may be used for the camera, and the sectionalized screen used for viewing.

Thus far, in the description of the stereoscopic projection system, we have treated the projection of motion picture photographs. It is also possible to project, stereoscopically, information which is not originally in photographic form, such as grids, coordinate systems, and the loci of points. The rays used for such projection which do not originate from photographs, may be synthesized using techniques to be explained.

In FIG. 15, there is shown in plan a viewing screen that may assume different positions 114, 115, 116, 117 and 118 by rotating about its axis 119. A projector 120, is shown generating the rays 121, 122, 123, 124 and 125. These rays are not generated simultaneously but the projector actually produces a single ray which sweeps clockwise from 121 and ends up at 125. The intermediate positions shown are for illustrative purposes only and are typical of the infinite number of positions that the ray sequentially assumes. If the projector 120 projects the ray 121 at the instant the screen is in position 114, the ray 126 will result from reflection. Similarly if rays 122 to 125 are generated for corresponding positions of the screen 115 to 118 respectively rays 127 to 130 will be produced. The reflected ray 128 is the reverse of projected ray 123 and follows the same path but in opposite directions. In FIG. 15, the bundle of rays 126 to 130 have a virtual source as indicated at 131, and an observer peering into the viewing screen will, if the rotation and the sweeping of the ray from the projector is repetitive, actually see this virtual point source 131.

In FIG. 16 a situation very similar to that of FIG. 15, except that the successive rays emanating from projector 120 have a slightly different spacing indicating a different angular speed of sweep when compared to the rays emanating from projector 120 of FIG. 15, and the rays sweep counterclockwise rather than clockwise. Now the rays reflecting from the screen 120 at the different positions 132, 133, 134, 135 and 136 are all parallel. An observer standing before the rotating screen of FIG. 16 will see what appears to him as a point source of light located at infinity.

All of the components of FIG. 17 are similar to those of FIG. 15 with the exception that the rays emanating from the projector have all been given an equal angular shift in the counterclockwise direction. In other words, a phase shift has been introduced into the rotational scan of the rays compared with the rotational scan of the screen. This angular phase shift is seen to produce an effective point source of light 137 similar to 131 of FIG. 15 but offset from the projector axis.

In FIG. 18 a single non-scanning beam 138 emanating from the projector 120 strikes the rotating viewing screen at 139. It is apparent that the reflected ray bundle indicates a virtual point source at this point 139. If the beam 138 were offset, a virtual point source would still exist at approximately the same depth as the screen but offset from the center.

In FIG. 19 is a similar showing to FIG. 16, except that angular sweeping speed of the rays emanating from projector 120 in FIG. 19 is greater than in FIG. 16. This causes an apparent source, no longer at infinity as in FIG. 16, but much more distant than virtual point source 131 of FIG. 15.

In FIG. 20 there is illustrated what happens when the rays from the projector 120 sweep laterally at such a high rate of speed that the screen does not have a chance to undergo any rotation. This situation produces a virtual point source 140 at exactly the same distance behind a viewing screen 141 that the projector 120 is in front of the screen. In order to produce the virtual point source 140 at the same depth but laterally offset therefrom as at 140', a phase shift would have been necessary between the transverse scan cycle of the rays coming from projector 120 and the rotational scan cycle of the screen. In other words this would have meant that the screen 141 in FIG. 20 would have assumed some other position than the position shown.

The following generalizations can be made for these types of ray deflection required against a flat scanning specular viewing screen with horizontal corrugations to produce an apparent source at various depths.

(1) An undeflected beam produces an image in the plane of the screen, FIG. 17; (2) a very high speed deflection compared to screen rotation rate produces a virtual source that is as far behind the screen as the projector is in front of the screen, FIG. 20; (3) by deflecting the ray in the same rotational direction as the rotation of the screen this can produce a virtual point source at a point between infinity and a distance as far behind the screen as the projector is in front of the screen, FIG. 19; (4) deflecting the projector beam in the opposite circular rotation to that of the screen can produce virtual point source of light extending from the plane of the screen out to a distance as far behind the screen as the projector lies in front of the screen, FIGS. 15 and 17; and (5) while not shown in the diagrams, if the projector beam rotates more slowly than twice the rotational screen speed, and in the same direction, virtual point source of light is produced which is in front of the screen rather than behind the same.

Certain geometrical definitions are appropriate at this point. The normal position of the projected beam is defined as that position which intersects the rotation axis of the screen. The horizontal angle of the projected beam is the angle between the horizontal projection of the beam and the horizontal projection of a normal beam. The normal position of the viewing screen is defined as that position when a tangent, in a horizontal cross-section, to the screen at the rotation axis, is perpendicular to a normal beam. The angle of the screen is the angle between the tangent for some arbitrary position of the screen, and the same tangent when the screen is in its normal position. In FIGS. 15 to 20, the beam angle is always equal to some constant value plus some multiplication factor times the screen angle. This constant value defines the phase angle and the multiplication factor is really the beam angle multiplication factor. As the screen rotates, or scans sinusoidally, in any manner, its angles as a function of time are defined, so therefore the beam angle is defined as a function of time, the beam angle thereby being the phase angle plus the beam angle multiplication factor times the screen angle. It is seen from FIGS. 15 to 20 that in order to place a virtual source at any distance before or behind the viewing screen, it is therefore only necessary to use the proper beam angle multiplication factor, and to produce an offset position requires only to use the proper phase angle.

The above generalizations and definitions may thus be summarized in the graph of FIG. 21. In FIG. 21, the abscissa represents the distance behind the viewing screen at which the virtual source exists. The distance between the projector and the screen is designated at S thereupon. For example, —S represents a virtual point source in front of the screen at the same distance as the projector, and +S is inside or behind the screen. The function displayed in the graph of FIG. 21 is discontinuous at the value +S. The ordinate of this FIG. 21 represents the beam angle multiplication factor. As an example in the use of the chart of FIG. 21, let it be assumed that it is desired to produce a virtual source somewhere between the screen and the projector. In order to accomplish this the projected beam angle multiplication factor will have a value between zero and approximately one-half with the rotational direction of the screen and the beam being the same.

The chart of FIG. 21 is derived for a flat uncurved rotating viewing screen. It is possible to derive similar charts for other than flat or curved rotating viewing screens. By constructing ray diagrams similar to FIGS. 15 to 20, and generalizing the results, the charts of FIGS. 22 to 24 may be derived.

The chart of FIG. 22 is based on a screen having a horizontal section either circular or parabolic with a projector located at a distance from the screen which is less than either half the radius of curvature or one half the focal distance. FIG. 23 is based on a cylindrical screen with a circular horizontal section with the projector located at the center of curvature. This chart is substantially the same as where a cylindrical screen with a parabolic cross section is used and the projector located at twice the focal distance from the viewing screen.

FIG. 24 shows a chart based upon a cylindrical screen with a parabolic cross section and the projector located at a distance from the screen equal to the focal distance. It is also approximately correct for a cylindrical screen with a circular cross section and the projector located at a distance from the screen equal to one half the radius of curvature of the screen. The graph of FIG. 24 is of interest because for all virtual point sources within the screen, the projected beam sweeps with the rotational direction as the screen. In addition, the amount of beam angle multiplication factor required varies smoothly from zero to infinity without any discontinuity.

In all of the above examples, as well as with every viewing screen, the viewing screens are provided with horizontally-corrugated surfaces for the vertical diffusion of projected light rays. The viewing screens may actually consist of combinations of fresnel lenses and mirrors and separate vertical diffusion elements which when used together provide the optical properties required for the screens to carry out this invention. One example of such a combination screen would be one which consists of a plane mirror, in front of which is a flat fresnel lens, cylindrical or spherical equivalent thereof in front of which is a flat transparent medium containing horizontal corrugations. A sandwich of these elements will form a viewing screen with the required optical properties, such that the screen will reflect and focus light rays in some manner in a horizontal plane and disperse them in a vertical plane.

Also, the elemental screen as shown in FIG. 13 could be used. In the construction of this type of a viewing screen, each element would be parallel to every other element where the equivalent of a rotating flat screen is desired. When the rotating equivalent of a contoured screen is desired, each element is given a permanent angular shift with respect to its adjacent element but rotates similarly therewith. By properly choosing the preset angles as a function of the distance laterally across the screen, the equivalent of a cylindrical, parabolic or any contoured surface screen may be produced. When each of the elements are rotated, maintaining the relative angles, about their individual axes, an effective rotating equivalent of the contoured surface screen is obtained.

Although three classes of surfaces have been described with relation to FIGS. 21 to 24, as planar, right-circular cylindrical, and right parabolic cylindrical curvatures, an infinite variety of other curvatures may actually be used without changing the scope of this invention.

The foregoing analysis is concerned with the synthesizing of a virtual point source of light using the rotating viewing screen and synchronized ray deflection from a projector. A line can also be projected as well as a point according to this procedure by taking the line as an assemblage of individual points.

To review, a point may be projected into a rotating mirror viewing screen, and appears to be in three dimensional space by projecting a pencil beam upon the viewing screen. The beam rotates or oscillates about the projector, and the screen is rotated or oscillated in the same manner. In general, the ratio of the beam angular velocity to the screen angular velocity determines the apparent depth of the virtual viewed point source, as per the examples in connection of FIGS. 21 to 24. The phase angle of the beam relative to the screen determines the right or left offset of the viewed point. The elevation angle of the projected beam determines the height of the viewed point. Thus, with these three parameters, a point may be made to appear anywhere within the bounds of the edges of the screen in depth or position to a viewer.

Assume there is a viewing screen with a parabolic horizontal section and a projector located at the focus, these conditions will correspond to the diagram of FIG. 24. FIG. 25 shows what might be a succession of frames to be used in the projector to project two points, one point $x$ a short distance in depth behind the screen, the other point $y$ a greater distance behind the screen and higher than the first point. The film being shown inverted as it would normally be used in a projection, and an oscillating screen being used so the points in FIG. 25 will oscillate back and forth. When the lower one of the two points, in film sequence of FIG. 25, is projected, it will produce a high beam with a large beam angle multiplication factor. While the upper point of sequence will produce an approximately horizontal beam with a low multiplication factor, the projection will thus appear as two points, one straight ahead and near to the viewer and the other point more distant and higher than the first point.

Assume it is desired to project a horizontal line upon the same screen, this line starts high, a short distance behind the screen, and as it recedes a distance approaching the horizon it becomes lower. Realizing that a line is an infinite string of points, FIG. 26 depicts a possible film sequence for this assumed line, while in FIG. 27 a sequence for a line $z'$ with the same viewed characteristics as that for FIG. 26 but for use with a flat oscillating viewing screen corresponding to the chart of FIG. 21 can be seen.

It should now be seen how points and lines might be synthesized within the space of the screen so that the viewer sees depth or three-dimension. It is thus easy to synthesize solid shapes in depth by outlining them with lines and in some cases indicating planes either by their line elements or points within the planes. Spatial networks and grids may be synthesized with all the elements placed on a single film strip or various elements on various film strips and by using several projectors simultaneously.

Thus, various methods of projecting synthesized information into the viewing screen of this invention suggest themselves. For the projection of stationary lines, networks, grids, objects, and so forth, a prepared film loop is run through a projector in exact synchronism with the rotation or oscillation of the viewing screen. The film loop is prepared photographically by photographing the desired shape upon an oscillating screen described earlier or by drawing the objects in animated fashion upon the film.

Also the required images may be electronically synthesized on the face of a cathode ray tube and projected onto a viewing screen. The proper time varying deflections on the face of the cathode ray tube can be provided by means of electronic circuitry.

It may be desired to project points onto the viewing screen whose position varies with time and is not known in advance. It may be desired that these points appear located in the space of a projected network or coordinate system. In order to accomplish this, the coordinate system may be projected onto the viewing screen by any of the techniques discussed so far and a variable position point may be projected simultaneously onto the viewing screen by one of the following techniques.

If the coordinates of a point to be projected are known in $x$, $y$ and $h$ relative to the projector, they may be converted to the polar coordinates, azimuth, elevation and depth distance D from the projector to the virtual image by techniques now well known. In FIG. 28A, there is shown such a Cartesian to polar coordinate converter 142, and a projector 143 which sends out a single beam of light which is controllable in elevation angle and in azimuth angle.

Another converter 144 converts azimuth to phase simply by proportioning, elevation to an angle-controlling input to the projector 143, and depth distance D into the beam angle multiplication factor, labeled BAMF in FIG. 28A. The three outputs from the converter 144 may be any controllable quantity such as shaft angles, linear motions, voltages, etc. The BAMF output is a function of the depth distance D and of a transformation of the depth D determined by the functions such as illustrated in FIGS. 21 to 24. The depth distance D is thus converted into BAMF, for example, by converting depth D into a shaft angle proportional to the depth D, then controlling the arm 148′ of a potentiometer 148″ by this shaft angle as shown in FIG. 28B. The potentiometer 148″ is a functional type of special design and supplies, directly, a voltage according to some desired transformation similar to one of the FIGS. 21 to 24. The elevation input to the projector 143 controls the elevation angle 145 of the projected beam 146. The set of coordinates 147 serves to define the projected beam. The X axis is aligned with the normal beam. The screen angle input 148 is a quantity corresponding to the instantaneous value of the screen angle. The projector 143, projects the beam 146 at a beam angle 149 equal to the phase input plus the BAMF input times the screen angle input. Thus, when the projector 143 is aimed toward the viewing screen 147 an observer will see the point source at its proper depth in the field screen corresponding to the original coordinates $x$, $y$ and $h$.

In FIG. 29 there is shown the use of a cathode ray tube 150 to accomplish the plotting of a point. The arm of a potentiometer is driven in correspondence with the viewing screen. The screen angle input 152, may be a direct mechanical connection from the screen or may represent the shaft of a servo-mechanism which follows the motion of the screen. The beam angle multiplication factor input is the form of a voltage which goes to an inverting amplifier 153 in such a fashion that the voltage and its inverse voltage both appear at the opposite ends of the potentiometer 151. If a screen angle of zero degrees corresponds to the center of rotation of potentiometer 151, the voltage appearing at the arm of the potentiometer 151 will be the resultant product of the BAMF and the screen angle. The output from the arm of potentiometer 151 goes into a summing amplifier 154 having a phase input. The output of amplifier 154 is thus the sum of the phase angle and the resultant product of BAMF and the screen angle. The output of the amplifier 154 goes to the horizontal deflection plates of the cathode ray tube 150 and thus generates a moving spot on the face of the cathode ray tube with the proper motions. The elevation input for the cathoder ay tube 150 goes to the vertical plates thereof to deflect the entire sweep up or down as required. The display on the face of the cathode ray tube is projected by means of a lens system 155 into the rotating viewing screen to provide a stereoscopic presentation of the point source described by the coordinates of the input. Multiple points may be projected into the screen by the use of several projecing devices of the type shown in FIG. 29. Another approach is to display, on the face of the cathode ray tube 150 a multiple of points by rapid time sharing sequence instead of a single point. In this case, there would be a multiple of all the apparatus of FIG. 29 except the cathode ray tube 150. An electronic switch would, in succession, deflect the beam of the cathode ray tube according to each of the different deflection voltages available.

A mechanical approach to plot a point is provided by the apparatus of FIG. 30 in which a light source 156 is located at the end of a small boom 157 fixed to a shaft 159 which is rotated by a motor 158. This motor 158 is driven by an amplifier 160 having one input 161 and the voltage output 162, of the output of amplifier 154 in FIG. 29. The other input 163 for the amplifier 160 is obtained from potentiometer 164 provided on the lower end of the shaft 159. The motor 158, potentiometer 164 and amplifier 160 comprise a servo mechanism which causes shaft 159 to have a rotation angle always proportional to the amplifier input voltage 161. The result of this is that the lamp 156 is rotationally displaced from some zero position in response to the sum of the phase angle and the product of BAMF and the screen angle.

The viewing screen may be designed to rotate continuously so that it occupies all angles between minus one hundred and eighty degrees and plus one hundred and eighty degrees. In the mechanisms described, it is impossible and unnecessary to utilize all values of screen angles when they are large. Since projected beams do not reflect into the viewing area when the screen angles are large, the projection mechanism may work with a limited range of screen angles, such as minus forty degrees to plus forty degrees. A lens 165 is raised or lowered in vertically spaced bushings 166 and 167, by means of rack 168 and pinion 169 according to the elevation shaft input 170. The light rays of the lamp 156 are projected through lens 165 and form beam 171 which is projected into the viewing screen. The beam 171 is thus elevated at an angle proportional to the elevation angle input of the shaft 170.

A desirable form of projection is to display, in three dimension, a point in space, then to permit the position of the point to vary, and while so doing, continuously display the line traced out by the moving point. This procedure presents the past-history as well as the present position of a moving point.

The general technique for accomplishing this would be to provide a recording medium, such as a closed loop of film, which has recorded on it the required images so that when the loop is run through a projector, a three dimension image of the point, at its proper position, will be produced in a rotating mirror viewing screen. This closed loop of film exactly repeats itself for each scan, or rotation cycle, of the viewing screen. Basically the required image on the film is that which would produce at the projector, an oscillating pencil of light as already discussed in connection with FIGS. 15 to 25. What must in principle be accomplished, is to alter each frame in the film loop, by adding to them new images representing the updated position of the moving point. The projection of this film, with the accumulated images corresponding to a moving point will result in a projection showing past history.

The apparatus for carrying out this procedure is shown in FIG. 31. This apparatus includes a point source generator 172 which corresponds to the devices of FIG. 29 or FIG. 30 above described and delivering a source of light 173 which has (1) a horizontal motion over a limited range equal to the beam angle multiplication factor times the screen angle, (2) a varying phase angle of oscillation, and (3) a height which can vary, and can be accomplished, as described above, mechanically by using a lamp, or electronically by using a cathode-ray tube. These three characteristics of the source of light determine the apparent position in space of the projected image.

A television camera 174 receives the image and projects it upon a closed loop of video recording tape 175 which has three channels and is circulated continuously over rollers 176. One channel is aligned with a video recording head 177 and a pick up head 178 for carrying the video information. Another channel is aligned with a pick up head 179, that carries a pre-recorded horizontal and vertical deflection signals to produce a conventional television raster scan. The last channel is aligned with a pick up head 180 that carries a single synchronization pulse. The entire tape loop 175 is of such length, and runs at such speed, that one complete circuit lasts exactly one scan or rotation cycle of the viewing screen. A line 181 carries, from a magnetic pick up at the screen, a synchronization pulse from a device such as 109 of FIG. 14. The synchronization pulse from line 181 is compared with the synchronization pulse, picked up from the tape 175 by a pick up head 180 and delivered to a comparator 182. The comparator 182 then develops a driving signal to run a motor 183 faster or slower, through motor drive 184 so as to maintain the tape synchronization pulse in synchronism with the pulse from line 181. The pick up head 179 supplies a sweep deflection for the camera tube of television camera 174 and a cathode-ray display tube 185. By this apparatus, all motions of light source 173 are recorded on the tape 175 by means of the television pick up tube and later rendered visible on cathode-ray tube 185. Since nothing is erased from the tape, the tape will accumulate the record of all motions of the lamp source 173 and continuously render the history of all the motions visible on the screen of cathode-ray tube 185. The video signal picked up by pick up head 178 is slightly delayed with respect to the signal recorded at head 177. This delay may be adjusted so that the signal occurs with exact synchronism during the next raster scan. This merely causes a slight phase shift in the projection resulting in all projected points slightly displaced sidewise. This displacement could be compensated by a fixed adjustment of the screen angle. A lens 186 focuses a beam 187 from the cathode-ray tube 185 onto a viewing screen.

Another scheme, analogous to the one above, for projecting a past history type of three-dimension plot is shown in FIG. 32. A continuous loop 188 of transparent film is coated with an ultra-violet sensitive dye which has absorption properties that are controlled and may be permanently altered by incident ultra-violet light and that is unaffected by visible light. It is therefore, possible to print an image with ultra-violet light and project the image with visible light without its being altered. A motion picture camera 189 has a film transport mechanism 190 through which the film loop 188 is passed. A light source mechanism 191 generates the motions required for the projection of points in three-dimension upon a viewing screen. The light source mechanism 191 would be similar to the light source generator 172 of FIG. 31.

The light source produces an image on the film loop 188 and merely reinforces the image as the loop repeats as long as the motions of the light source are repetitive. As the characteristics of the motion change, these changes are permanently accumulated on the film loop 188 thus storing all the variations and the complete history of the motions of the light source.

As with the tape loop 175 of FIG. 31, the film loop 188 makes one rotation per scan or rotation of the viewing screen. A synchronization mark on the film is picked up by a pick up device in the transport mechanism 190 to maintain synchronization between the film loop 188 and the viewing screen. The synch pulse, from the film loop, is compared (as with the tape loop 175) with the incoming synch pulse from the screen in a comparator similar to the comparator 182 which then generates control voltages for the motor in the transport mechanism 190.

Projector 193 uses visible light to project the image on the film into a viewing screen. Projector 193 may have a conventional light source, condenser, and shutter mechanism.

In general, the procedure for projecting points and their past history are not limited to the above specific embodiments, but adheres to the following principles. A recording technique is used to record the positions of a light source which exhibits the proper motions for projecting three-dimension points into a viewing screen. The recording medium is capable of producing a projection, into a viewing screen, of the recorded information while at the same time accumulating more recorded information of the positions of the light source. Other recording mediums such as thermo-plastic recording film, and so forth, are applicable.

Having thus described what is believed to be the best embodiments of the invention, it is not wished, however, to be confined to these embodiments, it shall be understood that such changes or departures from the detail construction shall be within the spirit and scope of the invention as defined by the appended claims.

What is claimed is:

1. In a stereoscopic system, means for recording images including a film camera and reflective surfaces spaced from the camera and rotating about their vertical axes from which images are recorded, means for running the film of the camera in timed response with the rotation of said reflective surfaces, means for projecting the images recorded upon the film including a projector and horizontally-ribbed reflecting viewing surfaces rotating about their vertical axes in same timed relation to the running of projected films so that the camera film is timed with respect to the reflective surfaces.

2. In a stereoscopic system, means for recording images including a film camera, reflective surfaces spaced from the camera and rotating about their vertical axes, a drive device interposed between the rotating surfaces and the film to operate the film in timed relation with respect thereto and a device acting upon the film to place a time marking thereon, and means for projecting the images recorded upon the film including a projector, horizontally-ribbed reflective viewing surfaces rotating about their vertical axes and a drive device operating in response to the marking of the film to rotate the reflective viewing surface therefrom and thereby at the time rate at which the images were recorded upon the film.

3. In a stereoscopic system, a mirror reflecting surface rotatable about its vertical axes and adapted to receive images, a film camera aligned with the spaced reflective surfaces to record upon a film the images reflected therefrom, means for rotating said reflector surface while taking the picture and placing markings upon the film in timed phase relation with the frame of the film, a projector receiving the taken film, horizontally-ribbed reflector viewing surfaces rotatable about their vertical axes for receiving the images projected from the film and drive means controlled from the markings on the film to drive the viewing surfaces about their vertical axes whereby the images projected upon viewing surfaces will be angularly synchronized with the rotation of the picture taken images with the camera film timed with respect to the reflective surfaces.

4. In a stereoscopic system, a reflective surface, means for rotating said reflective surface about its vertical axis, a film camera spaced from the reflective surfaces for taking moving pictures of images upon a film projected from the reflective surface, a projector receiving film with the projected images thereon, a reflective viewing surface horizontally-ribbed to diffuse the projected rays upon the reflective viewing surface in a vertical manner, and means for driving the taken film in the projector and rotating the viewing surface so as to be synchronized with the rotating reflective taking surface whereby the images recorded during the picture taking at certain angles of the picture making surface are projected upon the reflective rotating viewing surface at the angle in which they were taken.

5. In a stereoscopic system for projecting images of points, lines or pictures fixed in space comprising a reflective viewing surface rotating about its vertical axis, said surface containing horizontally-extending corrugations for the vertical dispersion of light rays, means for projecting a repetitive succession of images upon the viewing surface at each rotation of the viewing surface and means for synchronizing the projecting of these images of the points, lines and pictures with the corresponding rotating positions of the reflective viewing surface.

(References on following page)

References Cited by the Examiner

UNITED STATES PATENTS

| | | | |
|---|---|---|---|
| 1,950,374 | 3/34 | Kanolt | 95—18 |
| 2,002,090 | 5/35 | Ives | 352—43 |
| 2,055,118 | 9/36 | Carpenter | 352—65 |
| 2,252,467 | 8/41 | Luzzati | 352—61 |
| 2,351,294 | 6/44 | Schade | 88—24 X |
| 2,967,905 | 1/61 | Hirsch | 178—6.5 |
| 3,046,330 | 7/62 | Ross | 352—61 |

FOREIGN PATENTS

| | | |
|---|---|---|
| 657,062 | 9/51 | Great Britain. |
| 750,911 | 6/56 | Great Britain. |

JULIA E. COINER, *Primary Examiner.*